J. M. WARDLAW.
GEARING FOR MOWING MACHINES.
APPLICATION FILED DEC. 23, 1914.
1,162,323.
Patented Nov. 30, 1915.
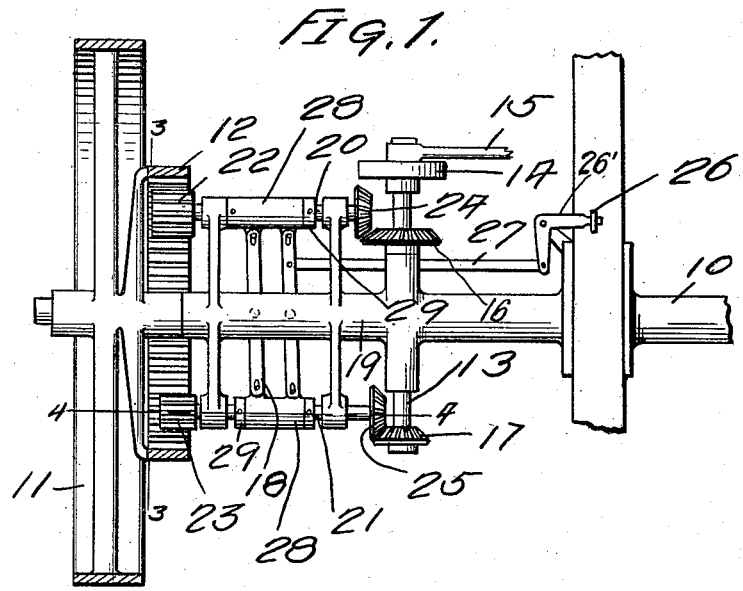
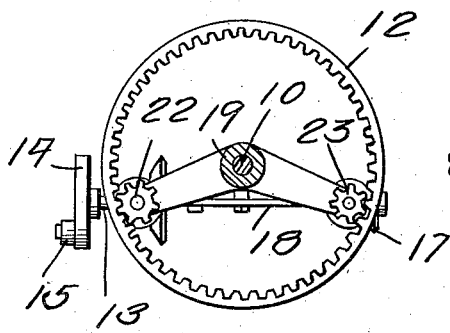
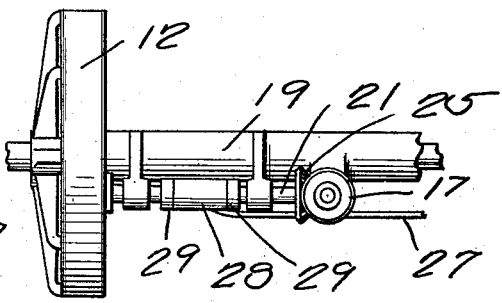
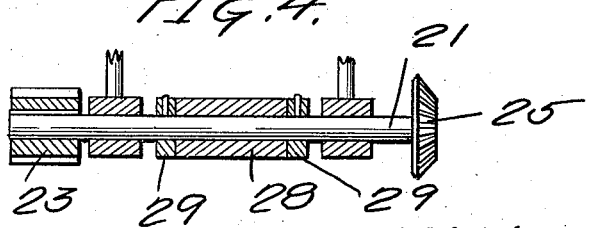
Inventor
J. M. Wardlaw
Witnesses
By
Attorneys

UNITED STATES PATENT OFFICE.

JOSEPH M. WARDLAW, OF BELTON, SOUTH CAROLINA.

GEARING FOR MOWING-MACHINES.

1,162,323.  Specification of Letters Patent.  Patented Nov. 30, 1915.

Application filed December 23, 1914. Serial No. 878,650.

*To all whom it may concern:*

Be it known that I, JOSEPH M. WARDLAW, a citizen of the United States, residing at Belton, in the county of Anderson, State of South Carolina, have invented certain new and useful Improvements in Gearing for Mowing-Machines; and I do hereby declare the following to be a full, clear, and exact description of the invention, such as will enable others skilled in the art to which it appertains to make and use the same.

This invention relates to improvements in gearing and particularly to gearing for mowing machines.

The principal object of the invention is to provide a simple and novel gearing which can be quickly and easily shifted to obtain high or low speed, without danger to the gears or stripping the teeth from the gears.

Other objects and advantages will be apparent from the following description when taken in connection with the accompanying drawings.

In the drawings: Figure 1 is a top plan view of a portion of my mowing machine showing my improved gearing, Fig. 2 is a front elevation, Fig. 3 is a section on the line 3—3 of Fig. 1, and Fig. 4 is a section on the line 4—4 of Fig. 1.

Referring particularly to the accompanying drawing, 10 represents the axle of the mowing machine on which is mounted the usual traction wheel 11. Carried by this wheel is an internally toothed ring or gear 12. The driving shaft 13 has the usual crank disk 14 on its forward end which drives the pitman 15 of the sickle bar. On this shaft are secured the beveled pinions 16 and 17. Disposed transversely of the axle 10, and in parallel relation are the levers 18, said levers being centrally pivoted on the casing 19 of the axle. Disposed at the ends of the pairs of levers are the parallel shafts 20 and 21. One end of the shaft 20 carries an elongated pinion 22 which constantly meshes with the teeth of the internal gear 12. The corresponding end of the shaft 21 is provided with a smaller elongated gear 23 also constantly meshing with the gear 12. The other ends of the shafts 20 and 21 are respectively provided with beveled pinions 24 and 25 which mesh respectively with the pinions 16 and 17 carried by the sickle bar driving rod 13.

Suitably mounted on the frame of the machine is a vertically disposed pivoted shifting lever 26 which is connected to one of the levers 18 by means of a bell crank 26′ and a link 27. Loosely mounted on each of the shafts 20 and 21 is a sleeve 28 and rigidly secured to each of the shafts at each end of each of the sleeves is a collar 29. Thus the shafts 20 and 21 can freely rotate within the sleeves 28 but are prevented from longitudinal movement through the sleeves. It will thus be seen that by shifting the lever 26 that the levers 18 will be rocked on their pivots and cause the movement of one of the sleeves 28 in one direction and the other sleeve in the other direction. This movement will engage the pinion 24 with the pinion 16 and disengage the pinion 25 from the pinion 17 in one direction of the movement of the levers 18 and vice versa in the opposite direction of movement.

It will be noted that the pinions 22 and 23 are elongated so that their teeth constantly mesh with the teeth of the gear 12. The teeth of both the gear 12 and the pinions 22 and 23 are of such depth that they will not disengage while being shifted, in spite of the fact that the shafts 20 and 21 move in arcs described about the centers of the levers 18. During the shifting movement of the shafts the pinions 22 and 23 would lift slightly and then again be moved toward the gear 12. Thus the provision of the deep teeth.

What is claimed is:

1. In a gear shifting device, the combination with a large gear, a counter shaft carrying smaller gears, a pair of parallel shafts disposed at right angles to the counter shaft and having their corresponding ends disposed adjacent said shaft, gears of different size carried by the other ends of the parallel shafts and meshing with the first-named gear and means for shifting said parallel gears simultaneously in opposite directions to simultaneously engage one and disengage one of the gears with respect to the gears of the counter shaft.

2. In a gear device, the combination with shafts disposed at right angles, one of the shafts carrying a large internal gear, the other shaft carrying a pair of beveled gears, parallel shafts arranged in parallel relation with the large gear shaft, gears carried by the parallel shafts and constantly meshing with the large gear, beveled gears carried by the other ends of the parallel shafts for alternate engagement with the gears of the section of the angularly arranged shafts, centrally pivoted parallel levers disposed between the parallel shafts, sleeves mounted on the parallel shafts and pivotally connected to the ends of the said levers, and means for rocking the levers on their pivots to move the parallel shafts in opposite directions.

In testimony whereof, I affix my signature, in the presence of two witnesses.

JOSEPH M. WARDLAW.

Witnesses:
D. D. BROWNE,
R. L. GRIFFIN.

Copies of this patent may be obtained for five cents each, by addressing the "Commissioner of Patents, Washington, D. C."